(12) United States Patent
Moses

(10) Patent No.: US 7,770,593 B2
(45) Date of Patent: Aug. 10, 2010

(54) BLEED VALVE

(75) Inventor: Erhard Moses, Einbeck (DE)

(73) Assignee: A. Kayser Automotive Systems GmbH, Einbeck (DE)

( * ) Notice: Subject to any disclaimer, the term of this patent is extended or adjusted under 35 U.S.C. 154(b) by 974 days.

(21) Appl. No.: 10/596,682

(22) PCT Filed: Oct. 7, 2004

(86) PCT No.: PCT/EP2004/011194

§ 371 (c)(1),
(2), (4) Date: Jun. 21, 2006

(87) PCT Pub. No.: WO2005/065977

PCT Pub. Date: Jul. 21, 2005

(65) Prior Publication Data

US 2009/0107561 A1    Apr. 30, 2009

(30) Foreign Application Priority Data

Dec. 23, 2003  (DE) .............................. 203 19 920 U

(51) Int. Cl.
*F16K 24/04*  (2006.01)
(52) U.S. Cl. ........................................ 137/202; 137/43
(58) Field of Classification Search .................. 137/39, 137/43, 202, 587
See application file for complete search history.

(56) References Cited

U.S. PATENT DOCUMENTS

| | | | |
|---|---|---|---|
| 4,753,262 A | 6/1988 | Bergsma | |
| 4,982,757 A | 1/1991 | Ohasi et al. | |
| 5,439,023 A | 8/1995 | Horikawa | |
| 5,573,030 A * | 11/1996 | Ohsaki et al. | 137/43 |
| 5,755,252 A | 5/1998 | Bergsma et al. | |
| 5,944,044 A * | 8/1999 | King et al. | 137/202 |
| 5,950,655 A * | 9/1999 | Benjey | 137/43 |
| 5,960,816 A * | 10/1999 | Mills et al. | 137/202 |
| 6,035,884 A | 3/2000 | King et al. | |
| 6,240,950 B1 | 6/2001 | Harris | |
| 2003/0098063 A1* | 5/2003 | Mori et al. | 137/202 |

FOREIGN PATENT DOCUMENTS

DE    696 01 135 T2    5/1999

\* cited by examiner

*Primary Examiner*—John Rivell
*Assistant Examiner*—Craig Price
(74) *Attorney, Agent, or Firm*—Fox Rothschild, LLP

(57) ABSTRACT

A bleed valve which is intended for the fuel tank of a vehicle has a housing, a floating body disposed in such a manner as to be able to move in the longitudinal direction. A rim of an outlet orifice forms a valve seat for a sealing element which is supported by a support disc, wherein the support disc is articulated in a cardanic manner on the floating body. The sealing element is disposed in such a manner as to be able to move according to the movement of the floating body between a position which closes the outlet orifice and a position which opens same, wherein as a result of the said articulation of the support disc on the floating body positional changes, e.g. inclined positions, which are caused by the drive operation of the vehicle do not impair the sealing function.

7 Claims, 5 Drawing Sheets

BLEED VALVE

FIELD OF THE INVENTION

The invention relates to a bleed valve, for example, for use in a fuel tank of a vehicle.

BACKGROUND

Bleed valves of this type are normally configured for vertical installation into the wall of the fuel tank of a vehicle and are intended to provide a continuous connection between the inner chamber of the tank above a fuel level and the outside environment, so that in the open position, air is able to escape from the tank during the filling procedure and air can flow into the tank as fuel is consumed, in order to prevent a vacuum from building up. In the event that the tank is overfilled or that the position of the valve is substantially deviates from its usually topside position on the tank, the last condition indicating that an accident has occurred or that the vehicle has overturned, creating a risk that fuel may leak out in an uncontrolled manner, the valve should be switched to its closed position. Therefore, in dependence upon the operating state of the tank or the vehicle, a device for automatically switching the valve should be configured in a reliable manner between an open position and a closed position. In particular, characteristic vehicle movements based on the drive operation of the vehicle are also to be taken into consideration for the operation of the valve.

A valve of this type is disclosed e.g. in DE 696 01 135. A floating body which cooperates with an elongate, strip-like, flexible membrane is disposed inside a cylindrical housing which on the base-side comprises inlet orifices and on the topside comprises an outlet orifice. The floating body can move axially inside the housing between an open and a closed position of the valve and is supported on the base-side by a spring. The movement of the floating body inside the housing and thus the switching position of the valve is thus determined quantitatively by the lifting force, which acts upon the floating body and is dependent upon the fuel level, by a mass force and by the force of the spring. On its side facing towards the floating body the outlet orifice which is configured in an elongate or slit-like manner forms with its rim a valve seat for the membrane which is fixed in the closed position of the valve between the valve seat, which extends in an inclined manner with respect to the axis of the housing, and a counter surface (the counter surface is also called a bearing surface as used in U.S. Pat. No. 5,738,132 which is related to and an English version of DE 696 01 135) of the floating body which extends in parallel with the valve seat. The membrane is secured merely at one end to the floating body. By reason of the inclined orientation of the valve seat and of the counter surface relative to the axis of the housing and thus the movement direction of the floating body, the opening procedure of the valve is characterised by the fact that the membrane becomes gradually detached from the valve seat.

U.S. Pat. No. 6,240,950 discloses a bleed valve for a fuel tank, in which a floating body is disposed in a housing and supports on its topside a cylindrical attachment, from the planar topside of which a guide mandrel protrudes axially parallel with the axis of the housing with a conical transition region positioned therebetween. The guide mandrel passes through a central orifice of a sealing element which is supported on a support disc, on which a guide sleeve is integrally formed on the underside and engages around the outer side of the cylindrical attachment. On the free end of the guide sleeve an annular projection is integrally formed on the inner side and in cooperation with an annular projection integrally formed on the outer side on the upper end of the projection defines the axial displacement capability of the support disc and thus of the sealing element. The housing is connected via inlet orifices to the inner chamber of the tank, so that according to the fluid level the floating body which is spring loaded on the underside is caused to float and furthermore until the sealing element lies against a valve seat which extends perpendicular to the longitudinal axis of the housing and issues into an outlet orifice. Although the connection of the support disc to the central attachment of the floating body ensures that the sealing element is able to move in a virtually cardanic manner with respect to the floating body, the sealing element and the valve seat normally extend, however, in parallel with each other by reason of the arrangement of the annular projections of the guide sleeve and the attachment which is concentric with respect to the longitudinal axis of the housing and this can render it more difficult for the sealing element to become detached from the valve seat.

U.S. Pat. No. 4,753,262 discloses a further bleed valve for the fuel tank of a vehicle, in which a floating body which is supported on the base-side by a spring is disposed in such a manner as to be able to move axially in a cylindrical housing which is provided with base-side inlet orifices. The housing is provided with a topside outlet orifice, of which the side facing towards the floating body forms a circular ring-shaped valve seat which is operatively connected to the membrane. Located on the topside of the floating body is a retaining element which forms a cage for the membrane and which is characterised by fingers which are disposed distributed uniformly in the peripheral direction and whose free ends the membrane is partially overlapped in the radial direction. In the axial direction of the housing the fingers comprise different lengths which are dimensioned with the proviso that in the event of a downwardly directed movement of the floating body which causes the outlet orifice to be revealed, the opening procedure begins at the point on the periphery of the outlet orifice which is allocated to the axially shortest finger so as to establish in turn an opening procedure which starts gradually. The valve seat extends similar manner to a counter surface of the floating body perpendicularly with respect to the axis of the housing.

Against this background, it is the object of the invention to provide a bleed valve of the generic type defined in the introduction such that an improved guiding effect is exerted upon the sealing element both during the opening movement and closing movement of the valve, in particular taking into account positional changes of the valve which result from the drive operation. In the case of a bleed valve of this type, this object is achieved by the use of a sealing element disposed on and connected to a support disc which has a facing side forming a counter surface for the sealing element, the support disc being articulated in a cardanic manner on a floating body.

Accordingly, it is essential to the invention that in contrast to the prior art set forth in the introduction, it is not a surface which is structurally connected in a fixed manner to the floating body but rather the side of a support disc which faces towards the sealing element and for its part is articulated in a cardanic manner with respect to the floating body which acts as the counter surface for the sealing element. This means that positional changes, in particular inclined positions which result from the driving operation, can be compensated for in a defined frame, so that the sealing function is not impaired. In terms of material, the support disc will regularly differ in view of its function from the sealing element and consist of a less elastic material, preferably synthetic material, which is relatively harder in comparison with the sealing element. In contrast, the sealing element is subjected to a support effect which stabilises its configuration and accordingly can consist of a relatively softer material which is adapted to fulfil a sealing function. These measures lead to improved guidance of the sealing element whilst at the same time improving the integrity of the seal.

An opening procedure according to a non-uniform detachment of the sealing element from the valve seat which commences at a point on the periphery of the valve seat and progresses from this point is advantageous in order to reduce the expenditure of energy during opening and release of the valve and thus to improve its reliability. A cardanic articulation of the support disc is provided whilst at the same time taking into account the detachment of the sealing element which commences at a point on the periphery of the valve seat during opening of the valve. Therefore, one of the two pivot axes is characterised by an inclined position with respect to the axis of the housing. The other pivot axis extends perpendicularly with respect to the axis of the housing. In the event of a non-cylindrical housing the same applies in relation to the longitudinal extension thereof.

The housing and the floating body which is located therein can comprise a structure which is rotationally symmetrical in relation to a central axis, so that the floating body moves between the open and closed position of the valve generally in the direction of the axis of the housing. However, a configuration of the housing and of the floating body which differs from the rotationally symmetrical shape is equally possible. The valve seat extends in a radial manner in relation to the axis of the housing, as well as perpendicularly with respect to the longitudinal extension of the housing. Thus the valve seat can be disposed correspondingly in a plane extending perpendicular to the axis of the housing or to the longitudinal extension thereof.

To improve the guiding effect exerted upon the movement of the support disc the support disc is pivotably articulated on the floating body about two mutually perpendicular pivot axes. These features on the whole improve the reproducibility of the movements of the support disc, the integrity of the sealing effect and the smoothness of the movements.

BRIEF DESCRIPTION OF THE DRAWINGS

The invention will be explained in detail hereinafter with reference to the exemplified embodiment which is illustrated by way of example in the drawings, in which.

DETAILED DESCRIPTION

Figure 1:
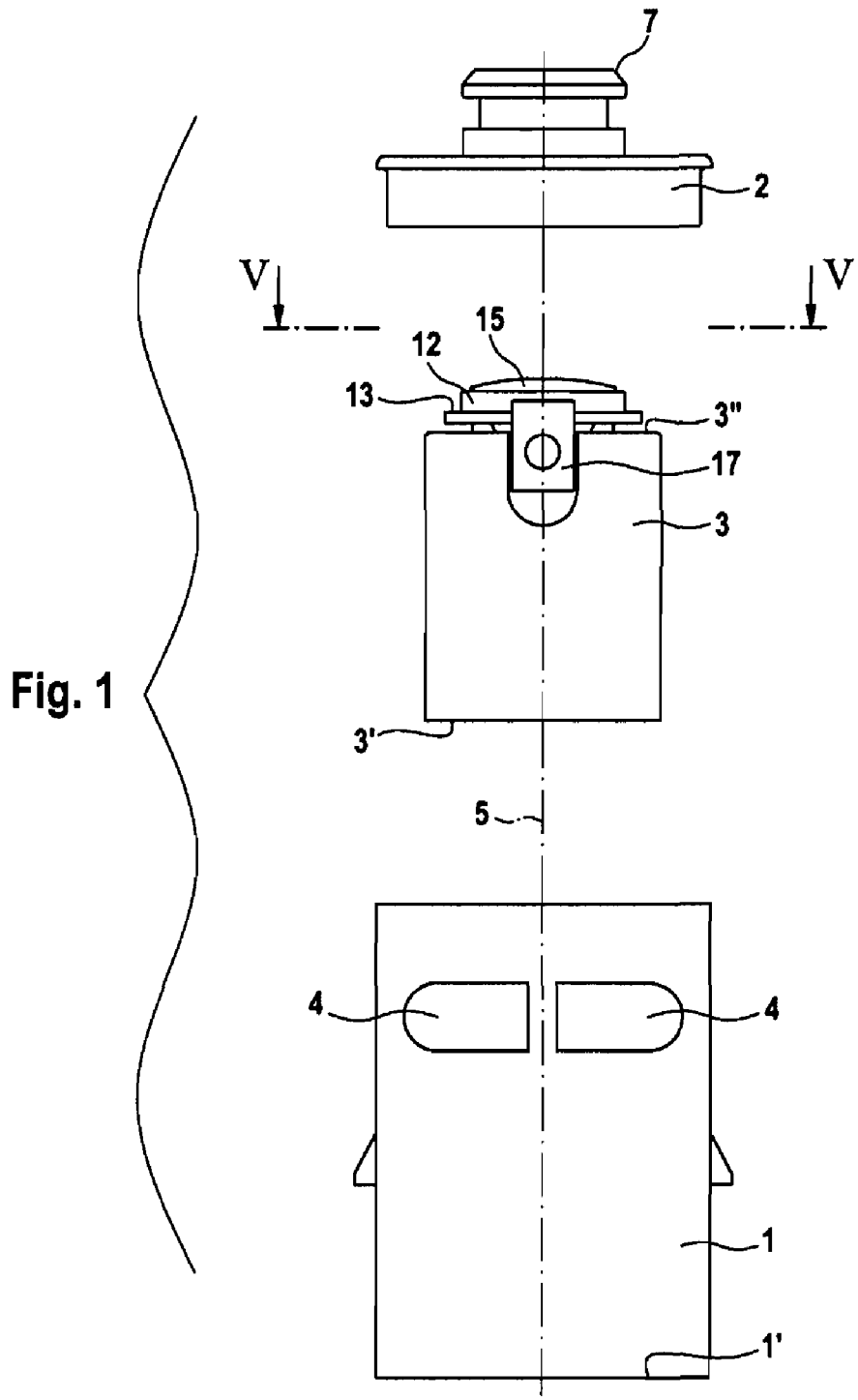
FIG. 1 shows an exploded view of the essential components of the bleed valve in accordance with the invention.
Figure 5:
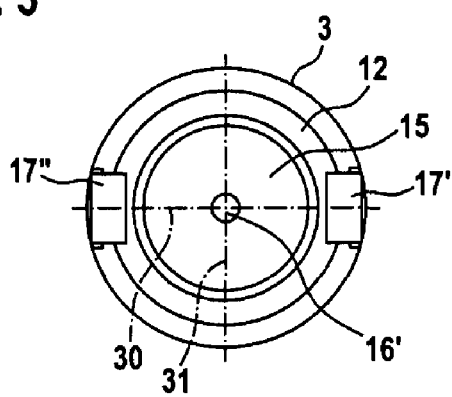
FIG. 5 shows a plan view of the floating body in accordance with a viewing direction V-V of FIG. 1.

Reference will be initially made hereinafter to FIGS. 1 to 2 and 5 of the drawings. As shown therein, the bleed valve consists of a cylindrical housing 1 which is closed off on the topside 1" by means of a preferably detachably inserted cover 2, and of a generally likewise cylindrical floating body 3 which is disposed in the housing 1 in such a manner as to be able to move in the direction of the longitudinal axis 5 thereof.

The floating body 3 can be guided in a non-rotatable manner inside the housing 1 in relation to the axis thereof by virtue of means which are known per se and are effective in a positive-locking manner. The housing 1 is provided on the topside with two mutually adjacent inlet orifices 4 and an outlet orifice 6 which extends in a coaxial manner with respect to the axis 5 is located in the cover 2. The outlet orifice terminates on the outer side in a connecting piece 7 which is intended for the connection of an output line.

The floating body 3 is supported in a manner known per se on the underside by way of a spring (32), on the base 1' of the housing 1, the mode of operation of the spring will be explained hereinafter. The floating body is provided with an annular-cylindrical chamber 8 which is open towards the underside 3' of the floating body and extends substantially coaxially with respect to the axis 5, wherein the spring is supported on the closed chamber base 9 of the chamber.

The topside 3" of the floating body 3 is characterised by a ring-like arrangement of identically configured support fingers 10 which extends substantially coaxially with respect to the longitudinal axis 5. The support fingers are integrally formed with the floating body 3 at uniform peripherally spaced intervals and protrude from the otherwise planar topside, which is radial in relation to the axis 5, of the floating body. The reference numeral 11 designates an approximately conically-shaped guide mandrel which is located in a central position inside the ring-like arrangement and protrudes from the topside 3" and whose significance will be explained hereinafter. In the illustrated exemplified embodiment, the guide mandrel extends a shorter distance axially in the direction towards the topside 1" than the support fingers 10 (see FIG. 2).

Figure 3:
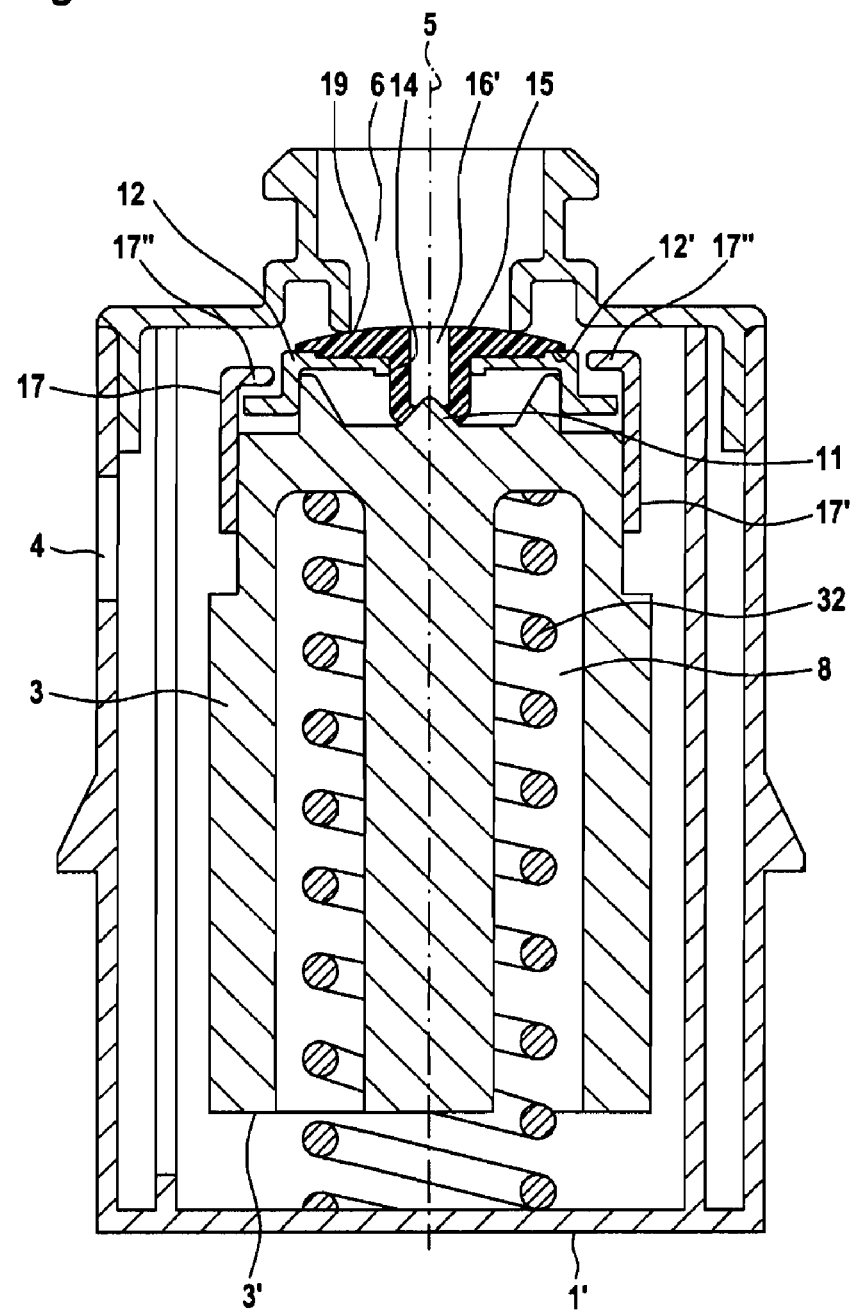
FIG. 3 shows an axial sectional view of the bleed valve of FIG. 1 in the closed position.
Figure 4:
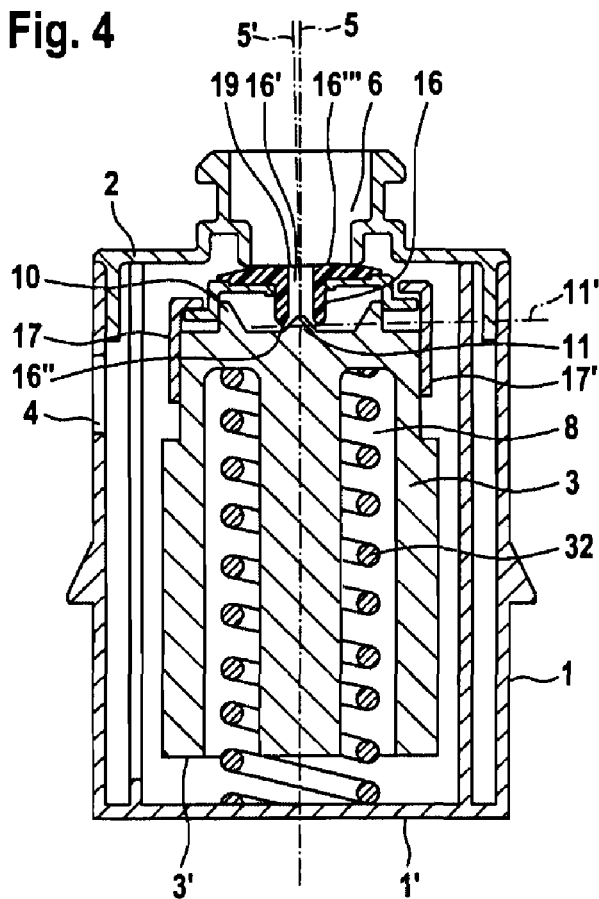
FIG. 4 shows an axial sectional view of the bleed valve of FIG. 1 at the commencement of a new opening procedure.

The reference numeral 12 designates a support disc which in the peripheral region forms an annular step which is adjoined by an annular flange 13. The support disc 12 comprises a central circular opening 14, into which protrudes a cylindrical projection 16 which is formed integrally with a sealing disc 15 and by means of which the sealing disc is releasably connected to support disc 12. The sealing disc 15 overlies the support disc 12 on its side facing away from the floating body 3, i.e., the support disc has a counter surface 12' for bearing against the sealing disc (see FIG. 2). The annular step of the support disc 12 encompasses the outer side of the arrangement of support fingers 10 and as a result thereof is subjected to a substantially axially directed guiding movement. A guiding or centring effect is also exerted by virtue of the guide mandrel 11 which protrudes into the open end 16" of the projection 16 facing towards the guide mandrel. The projection 16 also forms a continuous connection 16' (a fluid conduit) between its open end 16" facing towards the guide mandrel 11 and its open end 16'" facing towards the valve seat 19. The reference numerals 17, 17' designate two angular retainer elements which are attached in a mutually diametrically opposed manner to the floating body 3, each having an abutment section 17" extending over the annular flange 13, and which are intended to engage the top of the annular flange 13 as seen in FIG. 4 to lock in place a pivot axis 30 of the support disk 13 and thus the sealing disc 12 at an incline as further discussed below. The axial lengths of the retainer elements are different in dimension as shown. This means that the potential movements of the support disc 12 with respect to the two retainer elements 17, 17' accordingly will be different. In each case, according to the dimensions of the two retainer elements 17, 17' the entire system consisting of a support disc and sealing disc 12, 15 is subjected to an approximately cardanic suspension or mobility on or with respect to the floating body. Put another way, when the valve is in the fully closed position as shown in FIG. 3, the support disc and sealing disc 12, 15, can pivot about the mandrel 11 generally in any direction relative to the floating body 3, i.e., pivotally move about two mutually perpendicular pivot axes 30 and 31 as shown in FIG. 5. The pivot axis 30 passes through the retainer elements 17, 17' as shown. However, when the valve starts to open, i.e., as the float moves downwardly as illustrated in FIG. 4, the abutment section 17" of the shorter retainer element 17 engages the support disk 12 before the longer retainer element 17' does, thereby causing the pivot axis 30 to move to and be locked into an inclined pivot axis position 11' relative to the longitudinal axis 5. On the other hand, the other pivot axis 31 which is not affected by the retainer elements 17, 17' can remain perpendicular to the axis 5 and thus is not inclined. As used herein, a non-inclined pivot axis 30, 31 would be perpendicular to the longitudinal axis 5, while an inclined pivot axis 30 (11') would not be perpendicular to the longitudinal axis 5. Thus, when the pivot axis 30 is inclined as shown by 11', this pivot axis causes the support disc and sealing disc 12, 15 to be in the inclined position having a longitudinal axis 5' relative to the housing longitudinal axis 5. This allows the left side of the sealing disk 15 to pull away from the valve seat 19 before the right side as shown in FIG. 4 and as further described below.

The outlet orifice 6 is characterised by a comparatively short tubular element 18 which extends coaxially with respect to the axis 5 and protrudes into the housing 1 and whose free end 19' forms a valve seat 19 for the sealing disc 15.

Figure 6:
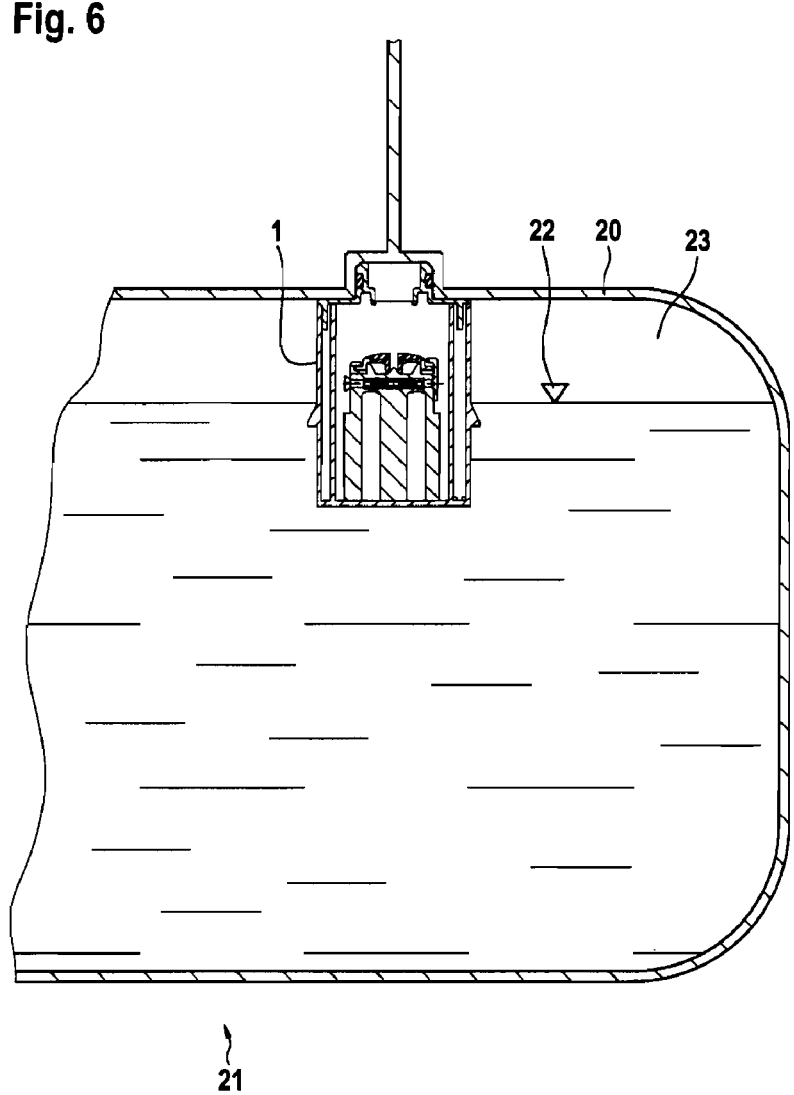
FIG. 6 shows a sectional view and partial view of the installation state of the bleed valve.

As shown in detail in FIG. 6, a bleed valve of this type is intended for installation into the topside wall 20 of the fuel tank 21 of a vehicle. The fuel tank is filled to a permissible level 22, so that in the type of installation shown where the housing 1 is located almost completely inside the tank, the inlet orifices 4 communicate merely with the head space 23 above the fluid. Other types of assembly of the bleed valve, in which the housing is located substantially outside the tank, are equally possible, wherein the inlet orifices have to be placed in different positions accordingly. However, this will be not be discussed further hereinafter.

Figure 2:
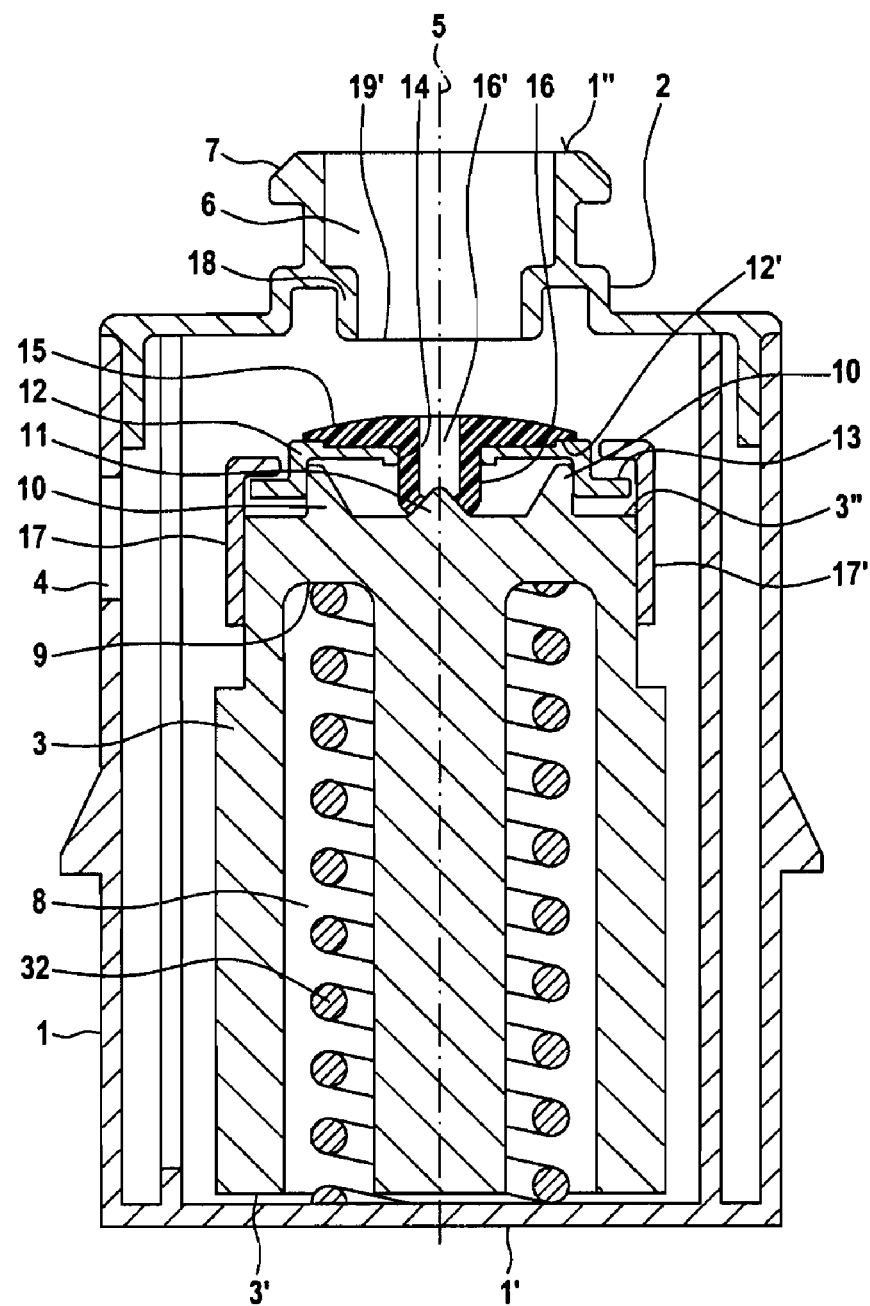
FIG. 2 shows an axial sectional view of the bleed valve of FIG. 1 in the open position.

As is known per se, the position of the floating body 3 inside the bleed valve, which is oriented vertically in the installed condition, is determined according to the forces which act upon the floating body, namely a resilient force which acts upon its underside 3', a lifting force in dependence upon the fluid level inside the housing 1 and a mass force, wherein the spring in conjunction with the material of the floating body 3 is selected with the proviso that in the open position of the valve as illustrated in FIG. 2 which is normally characterised by the absence of a lifting force, the resilient force is overcome by the mass force of the floating body 3 including the parts which are connected thereto and the floating body 3 sinks to the base 1' of the housing 1. In this case, a continuous connection (ventilation flow path) is established between the inlet orifices 4 and the outlet orifice 6, so that it is possible to ventilate and similarly bleed the tank substantially without any hindrance. The sealing disc 15 in this position thus does not have any contact with the valve seat and the support disc 12 lies on the underside on the guide mandrel 11 which at the same time exerts a centring effect upon the sealing disc or the support disc. A radial guiding effect is also exerted by the support fingers 10, the radial outer sides of which are disposed at a small spacing with respect to the radial inner side of the annular step of the support disc 12.

Reference will also be made hereinafter to the FIGS. 3, 4 of the drawings, in which functional elements which correspond to those illustrated in FIGS. 1, 2, 5 or 6 are designated with like reference numerals so as to obviate any repetition of the description in this respect.

The closed state of the bleed valve as illustrated in FIG. 3 is characterised by virtue of the fact that e.g. under the influence of a lifting force which is effective in addition to the resilient force and the mass forces, the floating body 3 has moved inside the housing 1 upwardly in the direction of the cover 2, so that the sealing disc 15 lies against the valve seat 19. The stabilising effect of the support disc 12 provides a reliable and reproducible sealing effect. At the same time, in this position the projection 16 is urged into sealing abutment against the guide mandrel 11. The retainer elements 17, 17' do not function when the valve is in this position.

The closed state of the bleed valve can occur as a result of the tank being overfilled or in the event of an orientation of the position of the axis of the valve which deviates substantially from the vertical orientation and which can be instigated by corresponding vehicle movements, in particular swinging movements, the negotiation of turns with a change in orientation, but also as a result of an accident, e.g. a vehicle overturning.

The cardanic suspension of the sealing disc 15 serves to provide a uniform sealing effect, to an extent dependent upon the different dimensions of the retainer elements 17, 17', along the valve seat 19 and the guide mandrel 11 even when the valve is in an inclined position, since any offset of the axes of the floating body 3 and of the housing 1 can be compensated for.

The state illustrated in FIG. 4 where the valve starts to open anew following on from a closed state is characterised by the fact that the sealing disc 15 becomes gradually detached from the valve seat 19, wherein the detachment procedure is initiated as a result of the movement of the floating body 3 in the direction towards the base 1' of the housing 1 by virtue of the retainer element 17 which in axial terms is relatively shorter, and correspondingly the valve begins to open at a point on the periphery of the valve seat, so that the sealing disc 15 assumes a temporary inclined position with respect to the axis 5. The expenditure of energy required for the detachment can be kept low in this manner, i.e., it is easier to unseat the sealing disc from the valve seat.

Furthermore, the detachment procedure also initially causes the projection 16 to lift off from the guide mandrel 11, with the consequence that starting from the inlet orifices 4 a continuous connection 16' is established via the projection 16 to the outlet orifice, thus further facilitating the detachment procedure.

A bleed valve of this type, in particular its housing, can be disposed in the wall of the fuel tank, in this case it can form a supporting structure on the outer side or can even protrude at least partially into the tank. As an alternative to this wall attachment, it is also possible to use a particular holding device, in which the housing is received and which provides a connection to the outlet orifice, wherein this holding device is held on a pump unit or another component or is disposed together with an independent line system on the inner side of the tank.

As a result, a structural element intended for use in a fuel tank is provided with the bleed valve in accordance with the invention and is characterised by a simple structural design and satisfies all operational requirements in a reliable and reproducible manner.

What is claimed is:

1. A bleed valve for the fuel tank of a vehicle, said bleed valve comprising:

a cylindrical housing having a housing base, the housing being intended for attachment to a wall of the fuel tank, said housing having a topside with an outlet orifice and a longitudinal axis;

at least one inlet orifice for communicating with the head space of the fuel tank;

a floating body within the housing;

a spring supporting the floating body on the housing base, said floating body being moveable longitudinally within the housing;

a valve seat for the outlet orifice defined by a rim;

a sealing element moveable according to movement of the floating body between a position which closes the outlet orifice and a position which opens the outlet orifice, said sealing element comprising a projection forming a fluid conduit extending from said sealing element towards said floating body, said fluid conduit having an open end facing said floating body;

a guide mandrel fixedly attached to an end of the floating body facing said valve seat for movement with said floating body, said guide mandrel being configured to close said fluid conduit opening when said valve is in the closed position, said sealing element fluid conduit extending towards said mandrel such that said mandrel is capable of sealingly engaging said open end of said fluid conduit and urging said sealing element against said valve seat when said valve is in the closed position;

a support disk connected to said floating body, the support disk having an integral annular flange and a counter surface facing said sealing element such that in the closed position of the bleed valve the sealing element is fixed between the valve seat and the counter surface, said support disk being mounted for pivotal movement about mutually perpendicular pivot axes; and a pair of mutually diametrically opposed axially extending retainer elements attached to the floating body, each retainer element extending upwardly from the floating body and terminating in an abutment section that extends over said annular flange for engagement therewith, and wherein said retainer elements are differently dimensioned with respect to one another such that the abutment sections are at different elevations with respect to the annular flange thereby causing one of said mutually perpendicular pivot axes to be inclined relative to said longitudinal axis of the housing as said retainer elements engage said annular flange when said valve moves from the closed position to the open position, said differing elevations of the abutment sections establishing said pivot axis which is inclined with respect to the longitudinal axis of the cylindrical housing, said floating body further including a ring-like arrangement of support fingers facing towards the support disk, the fingers being spaced apart in the peripheral direction and having radially inwardly facing surfaces for exerting a radial guiding effect upon a facing surface of the support disc.

2. A bleed valve according to claim 1, wherein the valve seat extends radially in relation to the longitudinal axis of the cylindrical housing.

3. A bleed valve according to claim 1, wherein the valve seat extends perpendicularly with respect to the longitudinal axis of the housing.

4. A bleed valve according to claim 1, wherein the sealing element is formed as a sealing disk having the fluid conduit forming projection integrally formed therewith, said support disk has a centrally positioned opening through which said fluid conduit extends to said guide mandrel, said guide mandrel is conically shaped and integrally formed on the floating body, and said guide mandrel protrudes from said floating body and sealingly closes the fluid conduit opening of the projection when the valve is in the closed position.

5. A bleed valve according to claim 2, wherein the sealing element comprises a sealing disk having said fluid conduit projecting centrally therefrom, and said guide mandrel is conically shaped and protrudes from said floating body to sealingly close the fluid conduit opening of the projection when the valve is in the closed position.

6. A bleed valve according to claim 3, wherein the sealing element comprises a sealing disk having said fluid conduit projecting centrally therefrom, and said guide mandrel is conically shaped and protrudes from said floating body to sealingly closes the fluid conduit opening of the projection when the valve is in the closed position.

7. A bleed valve for the fuel tank of a vehicle, said bleed valve having an open and closed position, said bleed valve comprising:

a cylindrical housing attachable to the wall of the fuel tank, said housing having a base, a topside, an outlet orifice, and a longitudinal axis therethrough;

at least one inlet orifice capable of fluid communication with the head space of the fuel tank;

a floating body moveable longitudinally within said housing to close and open said bleed valve;

a spring supporting the floating body;

a valve seat for the outlet orifice defined by an opening in fluid communication with said outlet orifice;

a sealing element moveable in response to movement of said floating body between a position which closes the outlet orifice and a position which opens the outlet orifice, said sealing element having a fluid conduit formed within a projection extending from said sealing element towards said floating body, said fluid conduit having an open end facing said floating body;

a guide mandrel attached to an end of the floating body facing said valve seat for movement with said floating body, said guide mandrel being configured to close said fluid conduit opening when said valve is in the closed position, said sealing element fluid conduit extending towards said mandrel such that said mandrel is capable of sealingly engaging said open end of said fluid conduit and urging said sealing element against said valve seat when said valve is in the closed position;

a support disc connected to said floating body, the support disc having an annular flange and an opening formed therein, said support disk being mounted for pivotal movement about mutually perpendicular pivot axes, said projection of said sealing element extending through said support disc opening to said mandrel; and a pair of mutually diametrically opposed retainer elements attached to the floating body for movement therewith, each retainer element extending axially from the floating body and terminating in an abutment section that extends over said annular flange to be engageable therewith, wherein said abutment sections are at different elevations with respect to the annular flange thereby causing one of said mutually perpendicular pivot axes to be inclined relative to said longitudinal axis of the housing when said retainer elements engage said annular flange as said valve moves from the closed position to the open position, said differing elevations of the abutments establishing said inclined pivot axis which is inclined with respect to the longitudinal axis of the cylindrical housing, said floating body further including a ring-like arrangement of support fingers facing towards the support disk, the fingers being spaced apart in the peripheral direction and having radially inwardly facing surfaces for exerting a radial guiding effect upon a facing surface of the support disc.

* * * * *